2,906,605

PRODUCTION OF HIGH PURITY TITANIUM BORIDE

Michael Dubeck, West Lafayette, Ind., assignor to Union Carbide Corporation, a corporation of New York No Drawing. Application November 4, 1954
Serial No. 466,936

7 Claims. (Cl. 23—204)

This invention relates to a process for the production of titanium boride of high purity.

Titanium boride is an extremely hard material having a hardness of over 9 on Mohs' scale. In addition to this hardness it retains much of its strength at extremely high temperatures. The properties of titanium boride render it suitable for use as an abrasive either in powder form or when coated on a rigid backing member. Additionally, titanium boride is used as a refractory, and metal cutting tools may be fashioned from it by bonding particles of titanium boride together with iron, cobalt, nickel, or other metals.

As a result of the procedures usually employed in making it, carbon, boron oxide and boron carbide are common contaminants of titanium boride. Such materials tend to lessen the abrasiveness of the titanium boride powder and weaken tools or refractory materials fashioned from the titanium boride.

It is the principal object of the present invention to provide a process for the production of titanium boride relatively free from contaminants. Another object of the invention is to provide a process for the production of titanium boride having a high degree of purity and of relatively large crystal size. More particularly it is an object of the invention to produce titanium boride by the reaction of titania, boron oxide and carbon which is substantially free of oxide impurities.

The objects of the invention are accomplished by reacting titanium dioxide, boron oxide and carbon under conditions which are described in detail below. The products of the reaction are titanium boride and carbon monoxide. The reaction proceeds according to the following equation:

$$TiO_2 + B_2O_3 + 5C \rightarrow TiB_2 + 5CO$$

The reaction is conducted in the presence of an excess of carbon to insure the complete reduction of oxides. In order to prevent the contamination of the product with carbon, it has been found that the excess carbon should be present in the form of large masses, for example in the form of rods, blocks, sheets, or tubes. The crystal size of the titanium boride is increased by conducting the reaction in the presence of sodium chloride.

As an example of the manner in which the process of the invention may be practiced, the following is a description of an experiment in which large size crystals of titanium boride substantially free of contaminating materials was produced. Into a carbon crucible 129 grams of titanium oxide, 177 grams of metaboric acid, 112 grams of finely divided carbon, and 25 grams of sodium chloride were charged. A carbon tube was inserted into the charge and a carbon disk placed thereon. The crucible was then placed in an induction furnace and heated to a temperature of 1650° C. This temperature was maintained for about one-half hour, after which the crucible was cooled slowly to room temperature. During the heating and cooling periods an atmosphere of argon was maintained around the crucible to prevent the oxidation of the titanium boride as it was formed. Upon the completion of the reaction the reacted materials in the crucible were friable which facilitated their separation from the carbon crucible and carbon tube. After the friable materials were broken away from the crucible and tube, they were crushed and leached with water to remove the sodium chloride present. The product in the form of large hexagonal crystals had the following analysis:

|  | Percent |
|---|---|
| Titanium | 68.2 |
| Boron | 30.3 |
| Boron carbide | Less than 0.2 |
| Total carbon | Less than 0.05 |
| Free carbon | Less than 0.05 |

The massive carbon used in the process of the invention must be such that unreacted portions of the carbon might easily be removed from the titanium boride. Carbon rods inserted into the reactants have been found to be a satisfactory means of providing the excess carbon necessary to complete the reaction without contaminating the product. Other shaped carbon masses will of course be understood to give satisfactory results. Best results have been obtained when no part of the reactants is more than about one inch from the massive carbon. That the massive carbon does react in the manner indicated is evidenced by the fact that crystals of boron carbide are easily detectable on the surface of the carbon mass after the reaction has been completed.

The crystal size of the titanium boride is increased on the order of five to ten times by the use of sodium chloride as described above. Preferably about 10% of sodium chloride by weight of the reactants is recommended. Without the sodium chloride, titanium boride produced according to the process of the invention is relatively uncontaminated even though, as indicated above, its crystals are smaller.

What is claimed is:

1. A process for the production of titanium boride which comprises mixing titanium dioxide, boron oxide, sodium chloride and carbon together, reacting the mixed materials by heating them in an inert atmosphere in the presence of an excess of carbon, at least a portion of said excess of carbon being present in the form of a shaped carbon mass inserted into said mixed materials, crushing the reacted materials, removing said shaped carbon mass from said crushed reacted materials, and leaching said crushed materials to remove said sodium chloride.

2. A process for the production of titanium boride which comprises mixing titanium dioxide, boron oxide, sodium chloride and carbon together, and reacting the mixed materials by heating them in an inert atmosphere in the presence of an excess of carbon, at least a portion of said excess of carbon being present in the form of a shaped carbon mass inserted into said mixed materials.

3. A process for the production of titanium boride which comprises mixing titanium dioxide, boron oxide and carbon together and reacting the mixed materials by heating them in an inert atmosphere in the presence of an excess of carbon, at least a portion of said excess of carbon being present in the form of a shaped carbon mass inserted into said mixed materials such that substantially all parts of the reactants are within about one inch from said massive carbon.

4. A process for the production of titanium boride which comprises mixing titanium dioxide, boron oxide and carbon together and reacting the mixed materials by heating them in an inert atmosphere in the presence of an excess of carbon, at least a portion of said excess of carbon being present in the form of a shaped carbon mass inserted into said mixed material such that substantially all parts of the reactants are within about one inch from said massive carbon and separating the reacted materials from said shaped carbon mass.

5. A process for the production of titanium boride which comprises mixing titanium dioxide, boron oxide and carbon together and reacting the mixed materials by heating them in an inert atmosphere in the presence of an excess of carbon, at least a portion of said excess of carbon being present in the form of a shaped carbon mass inserted into said mixed materials such that substantially all parts of the reactants are within about one inch from said massive carbon, crushing the reacted materials and removing said shaped carbon mass from said crushed, reacted materials.

6. A process in accordance with claim 1 wherein substantially all parts of the reaction mixture are within about one inch of said massive carbon.

7. A process in accordance with claim 2 wherein substantially all parts of the reaction mixture are within about one inch of said massive carbon.

References Cited in the file of this patent
UNITED STATES PATENTS 324,658  Cowles _____ Aug. 18, 1885

OTHER REFERENCES

Schwarzkopf et al.: "Refractory Hard Metals," 1953, pages 271–6.

Norton et al.: "Journal of Metals," vol. 1, page 749 (1949).

Glaser: "Journal of Metals," vol. 4, page 391 (1952).